B. J. TAYMAN.
Apparatus for Destroying Offensive Odors.

No. 213,853.    Patented April 1, 1879.

Witnesses
P. M. Noll
H. N. Frame

Inventor
Benjamin J. Tayman
Per Stephen Ustick Attorney

UNITED STATES PATENT OFFICE.

BENJAMIN J. TAYMAN, OF PHILADELPHIA, PENNSYLVANIA.

IMPROVEMENT IN APPARATUS FOR DESTROYING OFFENSIVE ODORS.

Specification forming part of Letters Patent No. 213,853, dated April 1, 1879; application filed October 24, 1878.

*To all whom it may concern:*

Be it known that I, BENJAMIN J. TAYMAN, of the city and county of Philadelphia, in the State of Pennsylvania, have invented a new and useful improvement in apparatus for destroying the offensive odors of fat-rendering, bone-boiling, and chemical works, and for deodorizing city garbage, of which the following is a specification:

My invention consists in the combination of an exhaust-fan, provided with two supplemental inlets for the admission of air and gas, with a tank charged with the material to be operated upon, and a furnace charged with charcoal or other material for generating fumes to be drawn through a pipe into the fan, where they mix with the gases from the tank, the mixture thence passing through a pipe leading from the outlet of the fan into a condensing-worm situated in a condensing-tub. As the vapor passes through the worm it is condensed and the offensive odors partly destroyed, and the liquid passed into a sewer through the discharging end of the worm and a pipe leading from it, and the gases are passed off through a tail-pipe into a furnace to be consumed, as hereinafter fully described. By substituting a furnace for the tank above mentioned the apparatus may be used for deodorizing city garbage during the process of drying.

Figure 1:
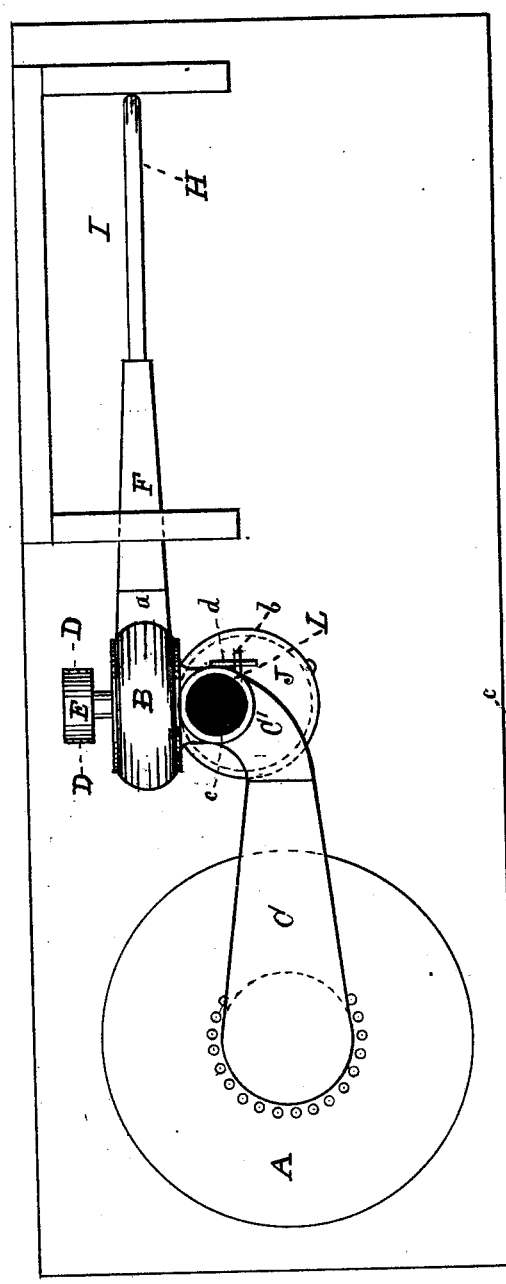
Figure 2:
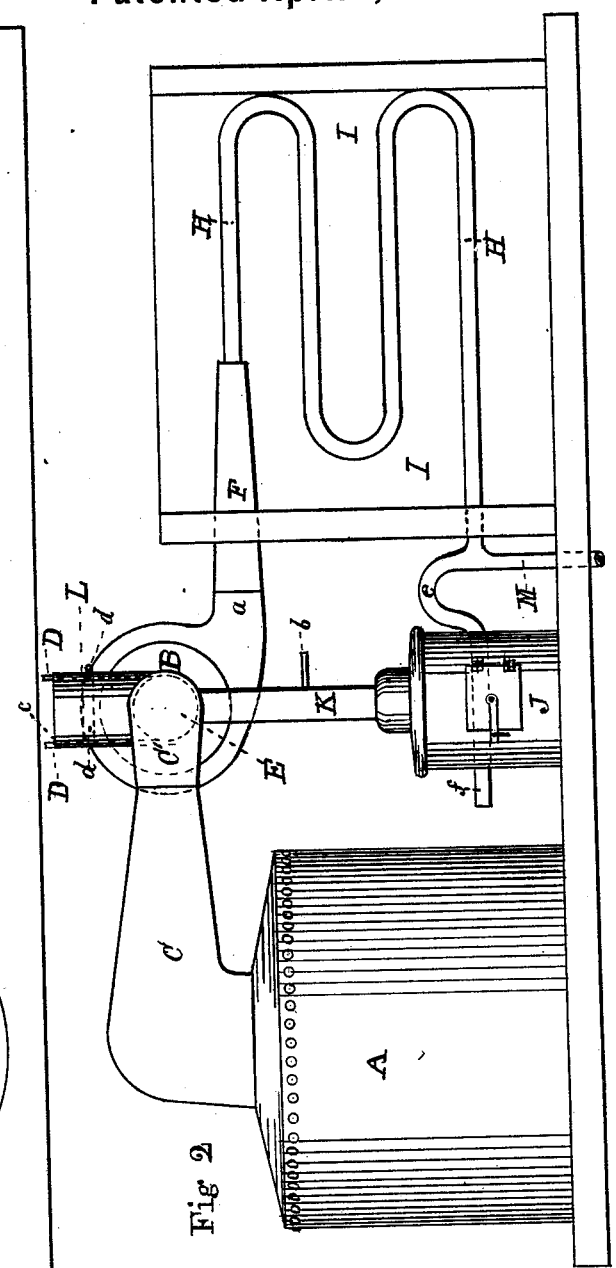

In the accompanying drawings, Figure 1 is a plan view of the apparatus. Fig. 2 is a front view of the same with the front side of the condensing-tub removed for the purpose of showing the condensing-worm.

Like letters of reference in both figures indicate the same parts.

A is the tank, which is charged with the material to be operated upon. B is an exhaust-fan, which is connected with the tank by means of the goose-neck C, the latter being connected with the main inlet C' of the fan. D is a belt, which passes around the pulley E of the fan and connects it with the motive power. (Not seen in the drawings.) F is a diminishing pipe, which is connected at one end with the outlet $a$ of the fan, and at its other end with the worm H, situated in the condensing-tub I.

J is a furnace for burning charcoal or other material for the generation of fumes. It has a vertical pipe, K, connecting its crown-plate with the inlet C' of the fan. The pipe is provided with a valve, $b$, for regulating the flow of fumes or gas to the fan.

L is a pipe, attached to the main inlet C' of the fan, having an inlet, $c$, for the admission of cold air when required. The inlet is provided with a valve, $d$, for regulating the flow of air, the object and use of these inlets being to supply the worm with cold air for condensing the vapor and the admission of the fumes of charcoal or other substances for deodorizing the mixture in its passage from the tank or furnace to the tail-pipe of the condensing-worm.

The operation is as follows: The tank A being charged with the material to be operated upon, when the generation of vapor has commenced the communication must be opened from the furnace to the fan by the adjustment of the valve $b$, and the fan set in motion, whereby the fumes from the furnace will be drawn into it and will mix with the offensive gases from the tank, the mixture passing through the outlet $a$ of the fan into the diminishing pipe F, and thence through the condensing-worm H. By the time it gets to the discharge-pipe M it will be condensed, and the liquid will pass through said pipe to the sewer, and the dry air or gases, having much less specific gravity than the liquid, will pass up the curve at $e$ at the end of the tail-pipe $f$, and thence into the fire-front of a furnace, and be destroyed before leaving the smoke-stack or chimney.

By substituting a furnace in place of the tank A city garbage may be deodorized during the process of drying or otherwise converting it into a fertilizing material.

I claim as my invention—

The exhaust-fan provided with two supplemental inlets and the charcoal-furnace J, in combination with the condensing-worm and tank or furnace, substantially in the manner and for the purposes set forth.

BENJAMIN J. TAYMAN.

Witnesses:
STEPHEN USTICK,
THOMAS J. BEWLEY.